United States Patent
Yamaji et al.

[11] Patent Number: 6,056,316
[45] Date of Patent: May 2, 2000

[54] SIDE AIR BAG

[75] Inventors: Takeshi Yamaji; Toru Ozaki, both of Osaka, Japan

[73] Assignee: Toyo Tire & Rubber Co., Ltd., Osaka, Japan

[21] Appl. No.: 08/939,527

[22] Filed: Sep. 29, 1997

[30] Foreign Application Priority Data

Oct. 3, 1996 [JP] Japan .................................... 8-283055

[51] Int. Cl.⁷ ................................................. B60R 21/22
[52] U.S. Cl. .................................... 280/730.2; 280/743.1; 280/730.1
[58] Field of Search ............................. 280/730.2, 730.1, 280/729, 743.1, 743.2

[56] References Cited

U.S. PATENT DOCUMENTS

| | | | |
|---|---|---|---|
| 3,792,873 | 2/1974 | Buchner et al. | 280/730.2 |
| 5,011,183 | 4/1991 | Thornton et al. | 280/743.1 |
| 5,322,322 | 6/1994 | Bark et al. | 280/730.1 |
| 5,586,782 | 12/1996 | Zimmerman, II et al. | 280/730.2 |
| 5,788,270 | 8/1998 | HÅland et al. | 280/729 |
| 5,865,465 | 2/1999 | Bauer et al. | 280/743.1 |
| 5,884,937 | 3/1999 | Yamada | 280/730.2 |
| 5,899,491 | 5/1999 | Tschaeschke | 28/730.2 |

FOREIGN PATENT DOCUMENTS

| | | |
|---|---|---|
| 2-158442 | 6/1990 | Japan . |
| 3-128743 | 5/1991 | Japan . |
| 2297950 | 8/1996 | United Kingdom . |
| WO90/09295 | 8/1990 | WIPO . |

Primary Examiner—Michael Mar
Assistant Examiner—Lynda Jasmin
Attorney, Agent, or Firm—Jordan and Hamburg LLP

[57] ABSTRACT

A side air bag expands near a window at a time of collision of a vehicle to restrain an occupant from moving in a lateral direction. The air bag has an expansion duration protracted to constrain the occupant during overturning of the vehicle. Stowability for stowing the air bag in a folded state in a side structure of the vehicle, such as a pillar and a roof side rail portion, is enhanced in that two woven fabrics are connected along an outer peripheral portion to form a bag portion a textile structure woven using a common yarn include in both fabrics. A whole of the bag portion is coated and sealed by an air non-permeable coating material to improve air tightness. A mounting portion for mounting the air bag in the side structure, such as a pillar or a roof side rail, is integrally formed by extending the woven fabrics or the common-yarn textile structure portion outward from the outer peripheral connection portion, thereby improving stowability.

6 Claims, 6 Drawing Sheets

SIDE AIR BAG

BACKGROUND OF THE INVENTION

The present invention relates to a side air bag which expands near a window of a vehicle at a collision of the vehicle, and particularly relates to a side air bag formed by a woven fabric such as a hollow weave.

An air bag apparatus for a vehicle is an apparatus for constraining a vehicle occupant, i.e. passengers and a driver, by inflating and expanding an air bag at a time of collision of the vehicle, and generally comprises an inflator (a gas generating device) for inflating the air bag in response to a signal from a sensor for detecting a predetermined collision characteristics of the vehicle. The air bag is inflated by gas from the inflator. The air bag is formed in a bag shape by a woven fabric.

A so-called hollow weave, in which two fabrics are interwoven as a woven fabric and a yarn constituting each of the fabrics partly form a common textile structure so as to combine two fabrics, is generally known in weaving for producing industrial materials and the like. There are some examples in which the woven fabric of the hollow weave is used for ane air bag, for example, JP-A-02158442 (Japanese Patent Unexamined Publication No. 2-158442) describes a bag formed by the hollow weave. JP-A-03128743 describes that connection of the woven fabric in the peripheral portion is performed by single-layer joint textile structure for connection, and similar matter is described in PCT WO90/09295 (PCT/GB90/00215, Japanese Patent National Publication of translated version 4-504988).

However, the air bags of these references are basically uncoated bags which are woven by hollow weave. The references disclose that air bags can be partly coated or coated, but have no intention for reducing an air-permeability of a fabric by coating.

On the other hand, while the conventional air bag apparatus includes an air bag for a driver's seat, an air bag for front-passenger seat and the like, a common point thereof is to constrain an occupant from the front within a short time such as some milliseconds to some ten milliseconds.

Recently, as an air bag apparatus, in addition to the above air bag apparatus which constrains the occupant from the front, a side air bag apparatus for constraining the occupant from a left-hand side or a right-hand side is developed.

The side air bag is structured such as to be housed in a side structure of the vehicle such as a front pillar, a roof side rail portion, a center pillar, a quarter pillar and the like, and as to receive a gas supplied from an inflator fixed to a bottom part of the front pillar or a neighboring side panel and the like at a time when the vehicle receives a predetermined impact from the side surface thereof so that the air bag inflates and expands near the window along a side surface of a cabin, thereby restraining the occupant from moving in a lateral direction of the vehicle.

A point in which the side air bag is greatly different from the above typical-type conventional air bag is that a long expanding time, such as some seconds, is required to be continued for constraining the occupant at a time of overturning of the vehicle.

Accordingly, the typical-type conventional air bag has a function of inflating and expanding for a short time, such as some milliseconds, to some ten milliseconds and of discharging the gas while constraining the occupant. In contrast to this, in the newly suggested side air bag, to meet a constraint requirement of the occupant at a time of overturning of the vehicle, it is required to set an expansion holding time to a relatively long time such as some seconds.

Further, the typical-type conventional air bag mentioned above is housed in a relatively large size trim part of the vehicle, such as a horn pad, an instrumental panel, a seat or the like, and a cross sectional area of the air bag in a direction of folded and piled fabrics is about 20 to 150 cm$^2$. However, in the side air bag, since it is housed in a column shaped pillar, a roof side rail portion or the like, there is a problem that the air bag has to be folded in a relatively small cross sectional area such as 4 cm$^2$ so as to be housed.

SUMMARY OF THE INVENTION

The present invention is made by taking the above described problems into consideration and an object of the present invention is to provide a side air bag housed in a side structure such as a pillar, a roof side rail portion or the like of a vehicle in which an air tightness thereof is improved so that an inflation holding time can be protracted and a bulk of a folded air bag is reduced so as to improve a housing performance for mounting into the side structure.

In accordance with a first aspect of the present invention which is suitable for the above object, there is provided a side air bag having a bag portion formed by connecting two woven fabrics in an outward peripheral portion and having a mechanism for expanding the bag portion alongside a window of a vehicle, wherein a connecting portion for connecting the two woven fabrics is formed by weaving a textile structure having a common yarn constituting both fabrics, and the whole of the bag portion is sealed by an air non-permeable coating material.

In the side air bag having the above structure, a sewing process and a sealing process for sealing stitch perforations in conventional manufacturing methods can be omitted so that an air bag having an air tightness for maintaining inflation duration an order of some seconds can be economically manufactured. Further, a side air bag that can meet a requirement for an occupant constraint at a time of overturning of the vehicle can be obtained.

In the conventional air bag, the sewn portion has a thickness of two fabrics and upper and lower threads of a sewing thread, and in addition to this, a tape for sealing the perforation is required. In contrast to this, in accordance with the above side air bag, the connecting portion along the outer periphery of the bag portion can be made thinner than a combined thickness of the two fabrics due to the structure of the textile structure and further, a sewing thread and a tape thickness for sealing the perforation is not required so that the connecting portion becomes significantly thinner in comparison with the conventional air bag. Accordingly, a bulk in a folded state is reduced so that the air bag can be housed in the side structure such as an elongated and narrow pillar, roof side rail portion and the like in a compact manner.

Further, in accordance with a second aspect of the present invention, there is provided a air bag side having a bag portion formed by connecting two woven fabrics in an outward peripheral portion and housing the bag portion in a side structure of a vehicle, such as a pillar and a roof side rail portion, wherein a connecting portion connecting the woven fabrics is formed by weaving, as a textile structure having a common yarn constituting both fabrics, both fabrics or the common textile structure portion is extended further outward from the connecting portion so as to form a mounting portion for mounting in the side structure, and further all said bag portion is sealed by an air non-permeable coating material.

In the side air bag having the above structure, as in the same manner as the above, an air tightness for maintaining inflation duration on an order of some seconds can also be maintained, and further, a housing performance for housing into the side structure such as the pillar and the like is improved. In addition to this, a housing performance for housing a mounting portion into the pillar and the like can be particularly improved, while the mounting portion can be formed without sewing a specially prepared fabric for the mounting.

Accordingly, in the case that the peripheral portion of the connecting portion is extended so as to integrally form the mounting portion to the pillar and the like, if both of the two woven fabrics are extended from the portion of the common textile structure, a mounting portion of two sheets piled without a continuous stitch can be formed and further if one of the woven fabrics is extended, the mounting portion having an improved housing performance can be formed with single sheet thickness. Further, if the portion of the common textile structure is extended as it is, the mounting portion having a higher strength can be formed.

In the case that the mounting portion is consisting of two fabric sheets, after separating up these two fabrics so as to be opened, if the coating is also applied to an inner side between the two fabrics in the mounting portion, that is, to and around the peripheral edge of the common textile structure, the sealability of the mounting portion can be further improved.

In the side air bag in accordance with each of the above inventions, a linear connecting portion for partitioning in parallel with a flow direction of an inflator gas is formed to connect two woven fabrics constituting the bag portion, at a center region of bag portion, and wherein the connecting portion for partitioning is formed by weaving as a textile structure having a common constituting yarn for both fabrics. Accordingly, an appropriate expansion shape can be easily set, and the thickness of the connecting portion for partitioning becomes thinner than the thickness of the two fabrics so that the housing performance for housing in the side structure such as the pillar and the like can be improved.

Further, the connecting portion for partitioning at the center region of the bag portion may be formed by a stitch, and an inflator-side terminal portion of the stitch may be formed as a U-shape or a circular shape. In this case, the inflating shape can be controlled and a stress concentration on the inflator-side terminal portion at a time of inflation of the air bag can be eased.

Still further, an opening for introducing an inflator gas can be formed in a part of the connecting portion.

DETAILED DESCRIPTION OF THE PREFERRED EMBODIMENT

An embodiment in accordance with the present invention will be explained below with reference to the accompanying drawings, however, the present invention is not limited to this.

Figure 1:
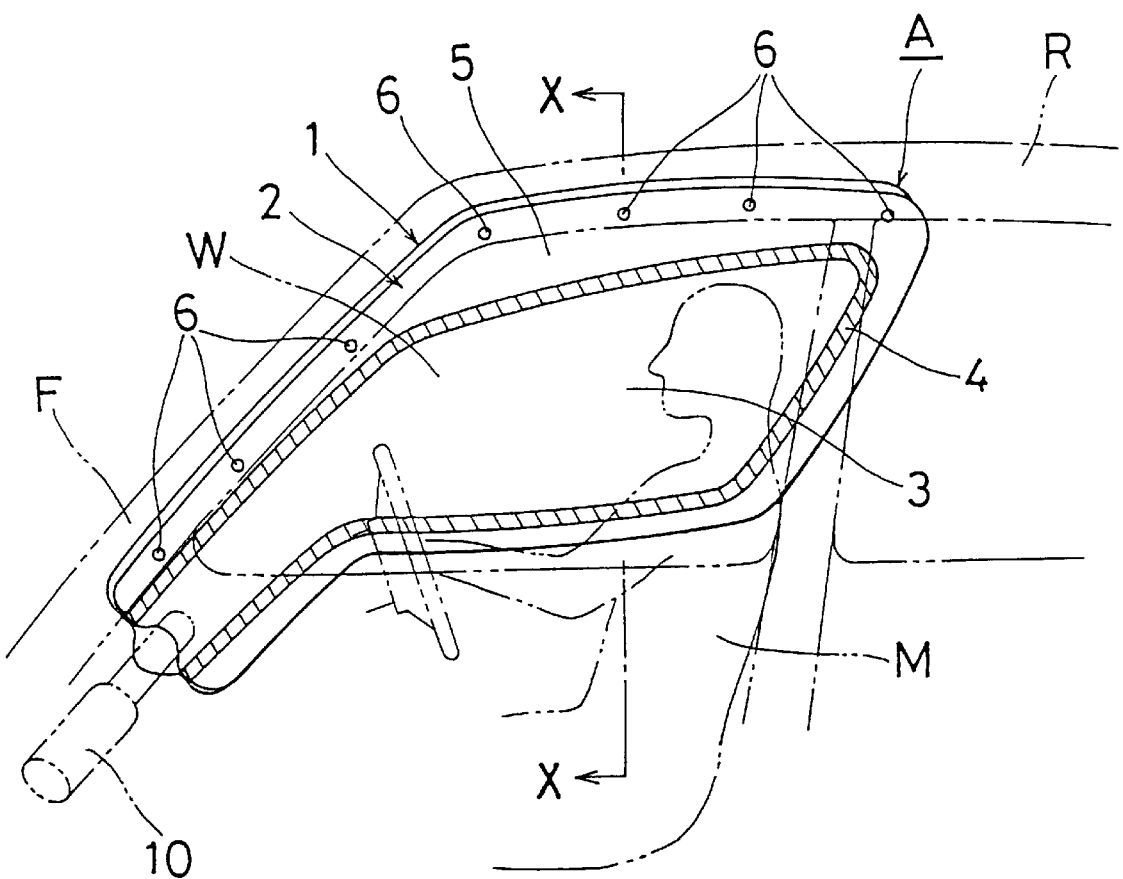
FIG. 1 is a front view which shows a side air bag in accordance with a first embodiment of the present invention.
Figure 2:
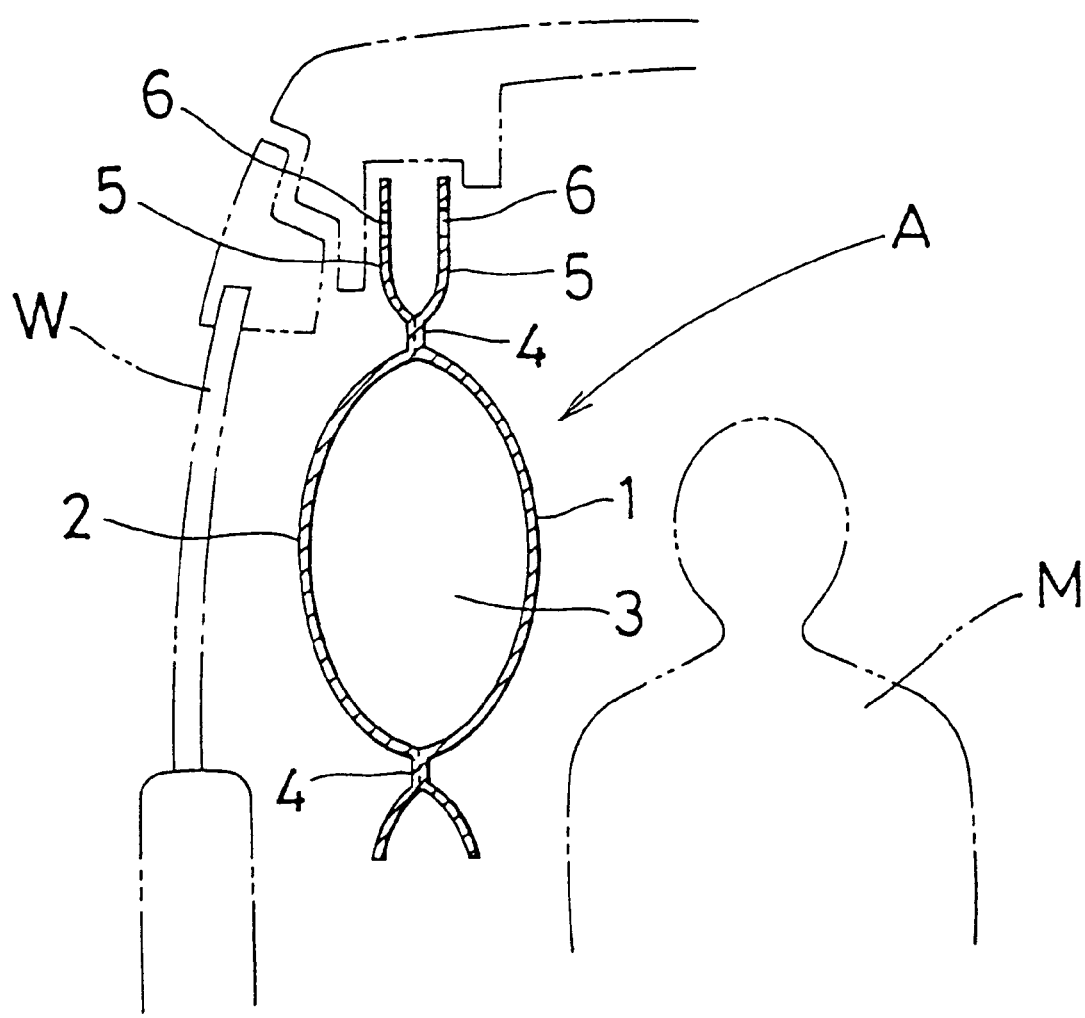
FIG. 2 is a cross-sectional view along a line X—X in FIG. 1.
Figure 3:
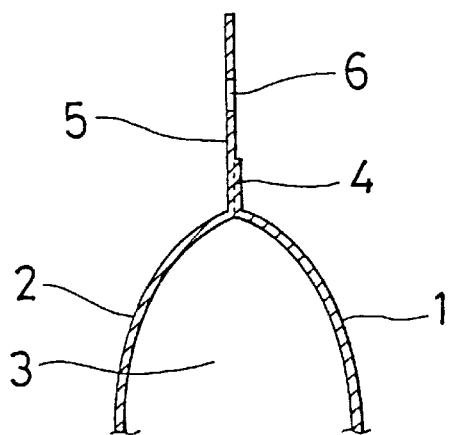
FIG. 3 is a cross-sectional view which shows an embodiment of a mounting portion of the air bag.

FIGS. 1 and 2 show a side air bag A in accordance with a first embodiment of the present invention and in these drawings, in order to show a used state of the side air bag, a part of a vehicle and an occupant are respectively shown by a chain line.

When a sensor detects a predetermined impact from a side surface of the vehicle, the side air bag A inflates and expands near a window W along a side surface of a cabin in response to a signal from the sensor, thereby constraining mainly a head of an occupant M from a left-hand side or right-hand side. The side air bag A also works at a time of lateral tumbling of the vehicle.

The air bag A is structured such that a bag portion 3 is formed by connecting two woven fabrics 1 and 2 which are formed by a plain weaving at an outer periphery thereof, as shown in the drawings. In this example, a front edge and an upper edge of the bag portion 3 is formed such as to substantially correspond to a curve extending from a front pillar F to a roof side rail portion R of the vehicle and to substantially shape a parallelogram in an expanded form along the window W so as to be naturally folded and housed in a side structure of the vehicle such as the front pillar F, the roof side rail portion R and the like.

Further, a front end portion of the air bag A is provided with an opening 9 for mounting an inflator, a part of which is extended in pipe-like shape to be opened, and for example, an inflator 10 mounted to a bottom part of the front pillar F is connected thereto.

The air bag A is formed by a hollow weaving, in which a connecting portion 4 disposed along an outer periphery of the both woven fabrics 1 and 2 is woven as a textile structure having a common yarn (a warp yarn or a weft yarn) constituting each of the both fabrics, that is, by a textile structure of single layer. Further, by extending both of the woven fabrics 1 and 2 outward from the connecting portion 4, a mounting portion 5 to the side structure, such as the front pillar F, the roof side rail portion R and the like, is integrally formed. A mounting hole 6 for a fixing bolt or a rivet is formed on the mounting portion 5.

Still further, all the surface of the bag portion 3, including the outer peripheral connecting portion 4, is coated for sealing by an air non-permeability coating material (not shown) such as a silicone rubber, a chloroprene rubber or the like so as to improve an air tightness to provide an expansion holding time for about 5 seconds.

The mounting portion 5 can be formed by two woven fabrics 1 and 2 as shown in FIG. 2, and can be also formed by extending any one of the fabrics 1 and 2 as shown in FIG.

Figure 4:
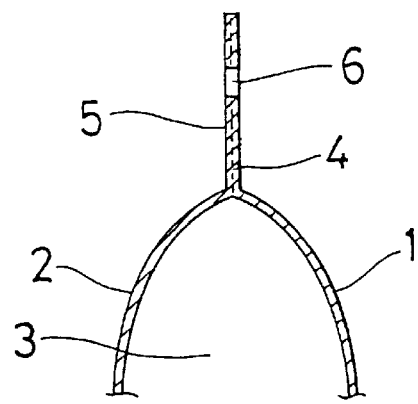
FIG. 4 is a cross-sectional view which shows another embodiment of the mounting portion of the air bag.

3, or by extending, as it is, the common textile structure portion formed by a hollow weave from the connecting portion 4 as shown in FIG. 4.

Figure 5:
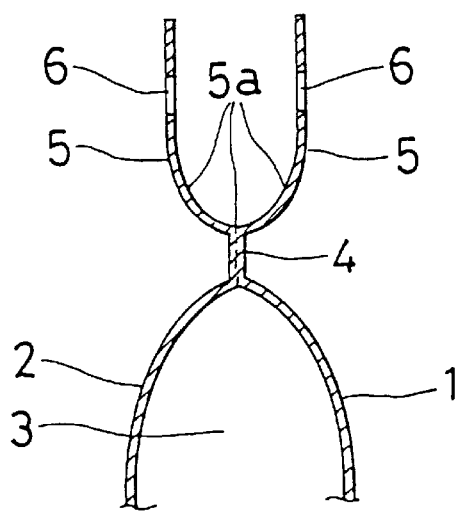
FIG. 5 is a cross-sectional view which shows a coating inside the mounting portion.

In the case that the mounting portion 5 is formed by the two fabrics 1 and 2, the air tightness of the bag portion 3 can be improved by coating an inner side 5a of the fabric in the mounting portion 5, particularly near the common textile structure portion by the coating material (not shown) as shown in FIG. 5.

Figure 6:
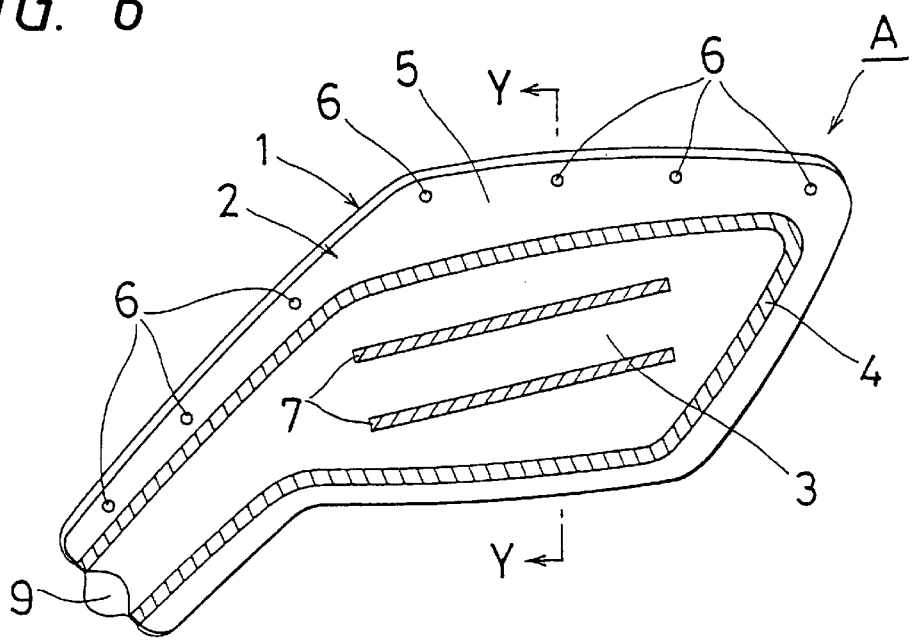
FIG. 6 is a front view which shows a side air bag in accordance with a second embodiment of the present invention.
Figure 7:
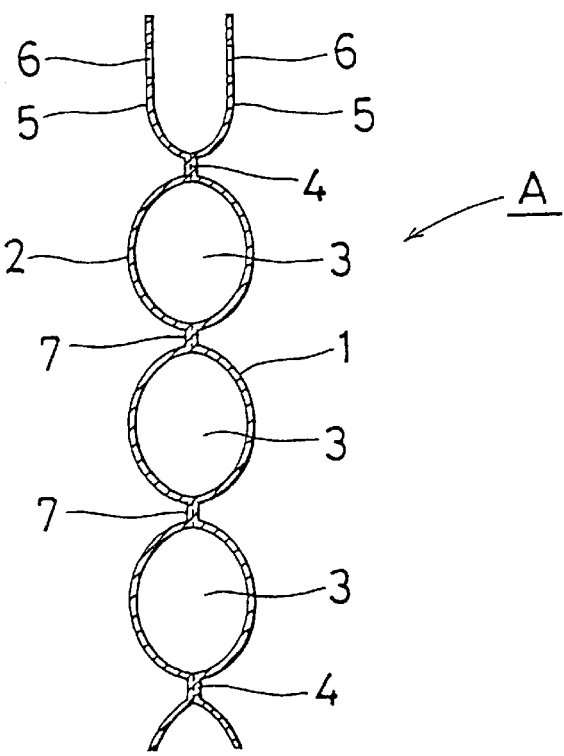
FIG. 7 is a cross-sectional view along a line Y—Y in FIG. 6.

A side air bag in accordance with a second embodiment of the present invention is shown in FIGS. 6 and 7.

The air bag A in accordance with this embodiment is provided with a connecting portion 7 for partitioning, in addition to the structure of the side air bag in accordance with the first embodiment. In FIGS. 6 and 7, the same reference numerals designate the same elements as in FIG. 1.

Accordingly, the side air bag A in accordance with the second embodiment is structured as follows. The connecting portion 4 along the outer periphery of the two woven fabrics 1 and 2 is made of the common textile structure by a hollow weave so as to form the bag portion 3. Two linear connecting portions 7 for partitioning, which are substantially parallel to a flow direction of the inflator gas are formed to connect the two woven fabrics 1 and 2, at the center region of the bag portion 3, as shown in the drawing. Further, the connecting portion 7 for partitioning is woven as formed by the textile structure having a common yarn constituting the both woven fabrics 1 and 2, as in the same manner as that of the connecting portion 4.

The connecting portion 7 for partitioning is provided for the purpose of controlling the expanding shape of the air bag during an inflating process so that a suitable inflated shape can be set. Further, the thickness thereof is thinner than the combined thickness of the two fabrics, as in the same manner as that in the outer peripheral connecting portion 4, so as to be easily folded and housed in the pillar and the like.

Figure 8:
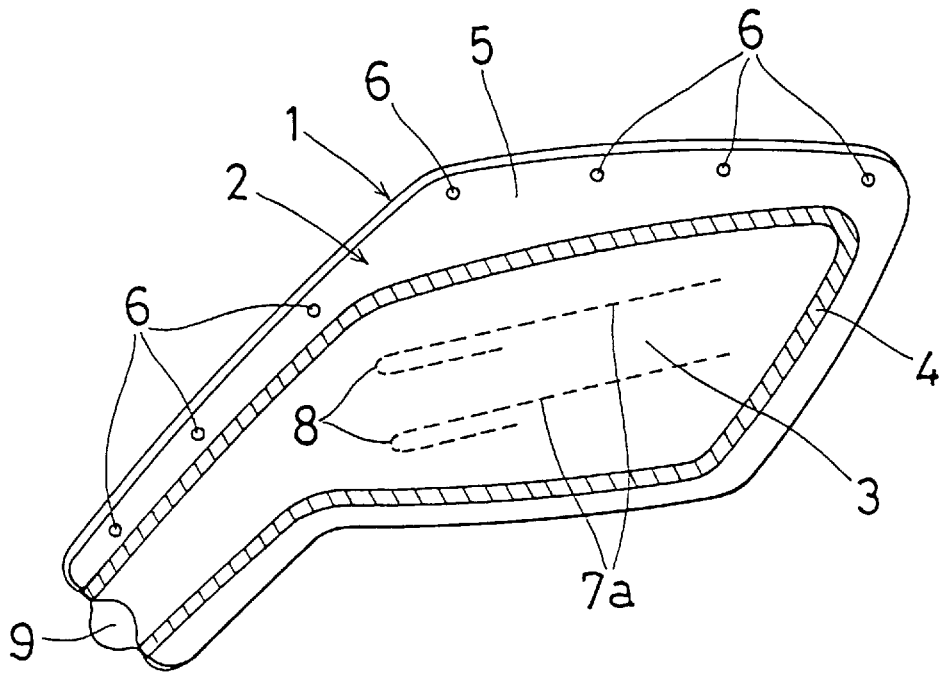
FIG. 8 is a front view which shows a side air bag in which a connecting portion for partitioning is formed by a sewing.
Figure 9:
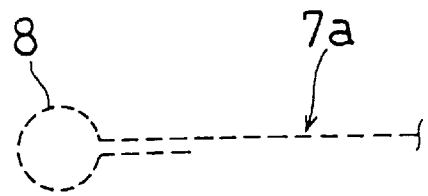
FIG. 9 is an enlarged view which shows a shape of terminal portion of a stitch.
Figure 10:
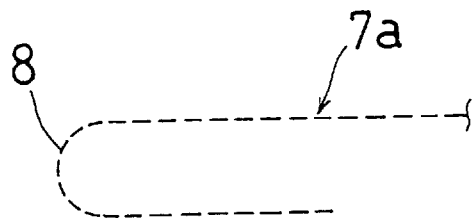
FIG. 10 is an enlarged view which shows another embodiment of the shape of terminal portion of a stitch.

In another embodiment, for example as shown in FIG. 8, the similar connecting portion 7 for partitioning can be formed by sewing. In this case, in order to ease a stress concentration during expansion of the air bag, as respectively shown in FIG. 9 and FIG. 10, it is preferable to form a inflator-side terminal portion 8 of stitching (a terminal portion 8 of stitch close to the inflator) as a circular shape having a diameter of about 3 to 30 mm or a U-shape having a width of about 3 to 30 mm. Further, a perforation of the stitch does not deteriorate the air tightness of the air bag since the coating using the coating material is performed in a later step.

Figure 11:
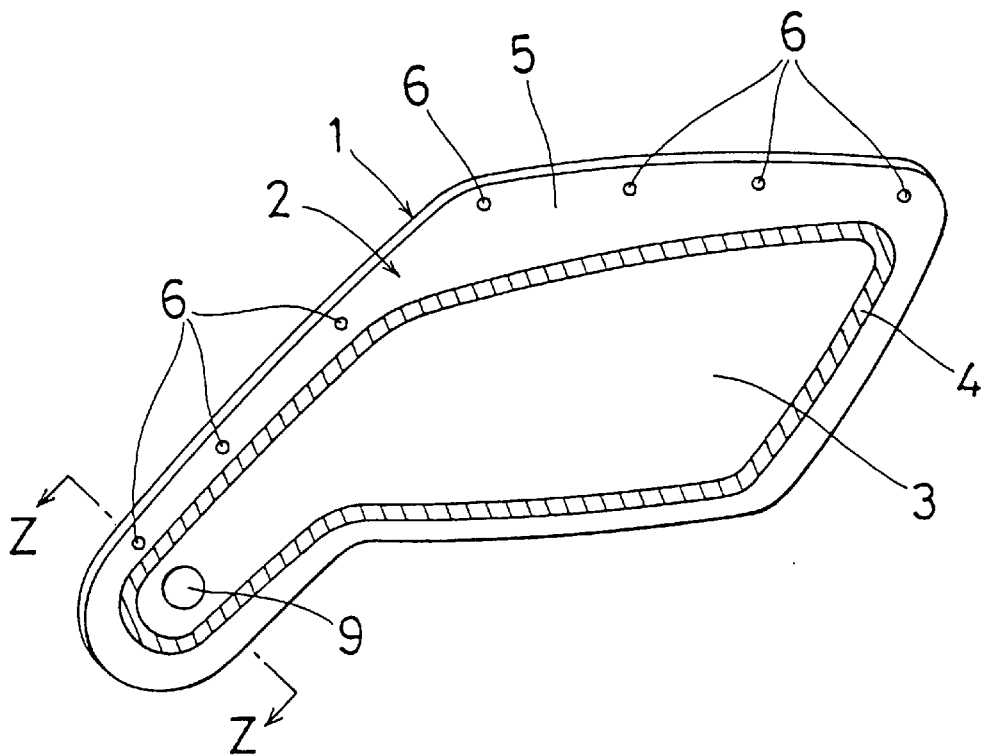
FIG. 11 is a front view of an air bag which shows an embodiment of an opening for mounting an inflator.
Figure 12:
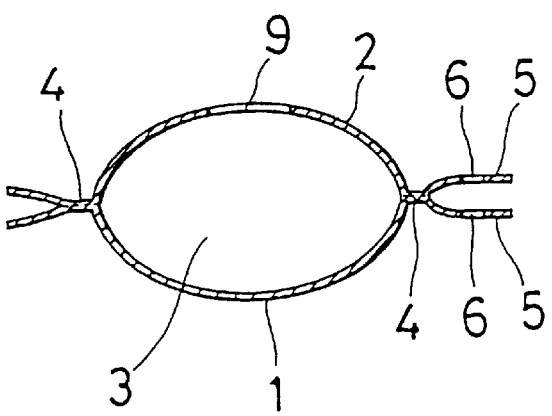
FIG. 12 is a cross sectional view along a line Z-Z in FIG. 11.

FIGS. 11 and 12 show another embodiment of the inflator mounting opening portion 9 in the air bag A.

In each of the above embodiments, the opening portion 9 is formed by extending a part of the bag portion 3 in pipe-like shape so as to open the part of the connecting portion 4; however, the opening 9 can be formed on one of the woven fabrics 1 and 2 by a laser cutting and the like, as shown in the drawings, after a bag portion having no opening is formed in the connecting portion 4.

The side air bag A in accordance with each of above-described embodiments is formed by a so-called hollow weave as the textile having the common constituting yarn in the connecting portion 4 at the outer periphery of the bag portion and the surface of the air bag is coated. Therefore, an air bag can be manufactured without the conventional sewing step and the sealing step sealing the stitch perforation. Thus, the air bag which can maintain a long inflation duration, for constraining the occupant at a time of over-turning of the vehicle, can be easily and economically manufactured.

Further, the connecting portion 4 can be made thinner than the combined thickness of the two woven fabrics, while the sewing thread and the tape for sealing the stitch perforation are not required. For this reason, the connecting portion is made thinner than that of the conventional air bag and the air bag can be easily folded and housed in the side structure of the vehicle such as the elongated and narrow pillar and the like.

Further, since the mounting portion to the side structure can be integrally formed by the fabric extending from the circular woven structure or the circular woven structure portion, it is unnecessary to sew the fabric for the mounting portion separately the mounting portion can be formed thin so as to improve the housing performance, and a number of the parts and the manufacturing steps can be reduced so that the economical efficiency can be further improved.

Whereas the embodiments of the present invention have been explained as above, the side air bag of the present invention can be housed and mounted to a side structure of the vehicle other than the pillar or the roof side rail portion.

What is claimed is:

1. A side air bag for inflation by an inflator mechanism for expanding the side air bag alongside a window of a vehicle, comprising:

a bag portion formed by two woven fabric panels connected along an outer peripheral portion by a peripheral connecting portion;

said peripheral connecting portion for connecting said two woven fabric panels being formed by weaving a textile structure having a common yarn included in both said two woven fabric panels;

said bag portion sealed over a whole area thereof by an air non-permeable coating material;

a linear connecting portion for partitioning in parallel with a flow direction of an inflator gas formed on a center region of said bag portion by stitching connecting said two woven fabric panels; and an inflator-side teal portion of the stitching being formed having one of a U-shape or a circular shape.

2. The side air bag as recited in claim 1, wherein an opening for introducing an inflator gas is formed in a part of said peripheral connecting portion.

3. The side air bag according to claim 1 wherein said peripheral connecting portion is non-continuous having a gap to form an opening for introducing an inflator gas, said opening being defined by said peripheral connecting portion and said two woven fabric panels.

4. The side air bag as recited in claim 3, wherein said opening extends to form a cylindrical duct.

5. The side air bag as recited in claim 3 or claim 4, wherein said opening is disposed at a front end part of the bag portion which is for positioning at a front side of the vehicle.

6. The side air bag as recited in claim 3 or claim 1, wherein one of said two woven fabric panels or said textile structure is extended outwardly from said peripheral connecting portion to form a mounting portion for mounting to a side structure of the vehicle.

* * * * *